United States Patent [19]

Melcher

[11] Patent Number: 4,864,480
[45] Date of Patent: Sep. 5, 1989

[54] PROCESS FOR OPERATING A SWITCHING CONTROLLER AND SWITCHING CONTROLLER FUNCTIONING ACCORDING TO THIS PROCESS

[75] Inventor: Domenic Melcher, Uster, Switzerland

[73] Assignee: Melcher, AG, Uster, Switzerland

[21] Appl. No.: 180,815

[22] PCT Filed: Jun. 18, 1987

[86] PCT No.: PCT/CH87/00070
§ 371 Date: Mar. 28, 1988
§ 102(e) Date: Mar. 28, 1988

[87] PCT Pub. No.: WO88/00408
PCT Pub. Date: Jan. 14, 1988

[51] Int. Cl.$^4$ .......................................... H02M 3/335
[52] U.S. Cl. .......................................... 363/21; 363/56
[58] Field of Search .............................. 363/19, 21, 56; 323/285, 286, 288

[56] References Cited

U.S. PATENT DOCUMENTS 4,146,832  3/1979  McConnell .......................... 363/17
4,504,898  3/1985  Pilukaitis ............................. 363/49
4,612,610  9/1986  Farnsworth et al. ................. 363/19

FOREIGN PATENT DOCUMENTS 0172487  2/1986  European Pat. Off. .
WO84/00085  1/1984  PCT Int'l Appl. .................... 363/21
WO86/03902  7/1986  PCT Int'l Appl. .................... 363/21

OTHER PUBLICATIONS

Stephens et al., "Flyback Converters for Multirail Switches," New Elec., vol. 14, No. 14, pp. 58–60, 14 Jul. 1981, (363/21).

*Primary Examiner*—William H. Beha Jr.
*Attorney, Agent, or Firm*—Johnson & Gibbs

[57] ABSTRACT

The operating process is based on the existance and cooperation of at least six functional units (64, 65, 66, 67, 68, 70), whereby the functional units (65, 66, 67) have a monitoring and control function. Functional units (64, 68, 70) together form the pause and frequency control circuit. Functional unit (65) monitors demagnetization of the transformer (2), functional unit (66) controls the time-averaged output current and functional unit (67) controls the output voltage of the switching controller. Functional unit (64) forms the voltage time-integral of the input voltage and functional unit (68) determines the target value of this voltage time-integral according to the pause duration determined. The process can be extended to monitoring the input voltage for the overshooting of a maximum value by a functional unit (71) and for under-shooting of a minimum value by a functional unit (72). A new switching phase can begin only if all functional units (65, 66, 67, 71, 72) having monitoring functions issue a release signal to an AND-gate controlling a bistable switch (70).

14 Claims, 6 Drawing Sheets

PROCESS FOR OPERATING A SWITCHING CONTROLLER AND SWITCHING CONTROLLER FUNCTIONING ACCORDING TO THIS PROCESS

BACKGROUND OF THE INVENTION

1. Field of Invention

The present invention refers to an electric power supply for a switching regulator. The power supply falls within the class of switching power supplies and more specifically within the subgroup of power converters.

2. History of the Prior Art

The state of the art regarding power converters is presented in the paper: "Schaltnetzteile" (Switching Power Supplies) by Joachim Wustehube (Hrsg), Grafenau/Berlin, Federal Republic of Germany. Supplements to the state of the art are contained in the "Technical Newsletter 3/85," Siemens AG, Munich, Germany.

While existing switching controllers experience no problems under normal operating conditions, difficulties arise for existing switching controllers when they are subjected to extreme conditions and special requirements. Often these problems cannot be resolved at the same time or with the same process. Examples of such extreme conditions are:

short circuit
- During fixed frequency operation, the direct short circuit of the secondary results in an almost complete breakdown of the output voltage $V_0$ and a marked increase of the current. The short circuit is countered by shutting off the switching controller and then turning it on again with a soft starting circuit.
- If the short circuit persists, this procedure is repeated, which allows the current to increase repeatedly in accordance with the threshold characteristics.

no-load operation
- Because a true no-load operation is not possible with the procedures and means known today, conventional solutions to the no-load condition include (1) skippig pulses of increasing size that produce a $V_0 < = V_{Onominal}$ when a maximum voltage $V_0$ is reached in fixed frequency operation or (2) operating with the use of a built-in initial load.

sudden, severe load changes large fluctuations of the input voltage

Examples of such special requirements are:

parallel operation of the switching controller
- If two power converters with soft start circuits are connected in parallel, the probability that both will operate exactly in phase is infinitesimal. They will therefore impede each other during an attempt to re-power the system.

limited range of the switching frequency
- Conventional operating procedures of switching controllers are based on a control oscillator that usually oscillates on a fixed frequency. A fixed frequency may be selected to avoid interference with an appliance powered by the regulator (for example, a TV set). In this case, only the keying ratio between turn-on time of the transformer primary winding and the period of the oscillation is variable. If the frequency is kept variable, however, it fluctuates between approximately 200 KHz and a few KHz depending on the operating conditions. The frequency reaches the audible range of the human ear at approximately 16 KHz.

Dimensioning of the input filters is therefore extremely difficult, and the switching controller becomes a source of acoustical interference.

SUMMARY OF THE INVENTION

The object of the invention is the following:

The disadvantages of conventionally known solutions are overcome.

A procedure is established in which various operating circuits are covered. Among the latter, the following requirements are pointed out in particular:

The output voltage is regulated.

The output current is regulated.

No-load protection is provided, including no-load operation.

Short circuit protection is provided with a constant current short circuit characteristic.

A large range of input voltages may be accepted.

The possibility of parallel connection with other power converters of the same operating process and the same design is provided for.

Switching frequency is variable, but it is limited to avoid a relationship with the internal phasing of the regulator.

Switching frequency is limited and to some extent stable in order to facilitate dimensioning and to remain outside the audible range.

The operational process of the invention and the power converter of the invention are characterized by the individual treatment of the output voltage $V_0$, the maximum average output current $I_0$, the demagnetization of the transformer via the minimum secondary current, and the maximum input voltage-time integral in monitoring functions and circuit components. The invention is further distinguished because the power converter is separated from the input voltage when the maximum input voltage-time integral has reached a pre-determined value that is established by the apparatus. Reclosing occurs only when $V_0$ and $I_0$ have not exceeded their maximum values, and the secondary current remains below its minimum threshold. Process and apparatus also lower the input voltage-time integral that is determined by the apparatus if the normal output current at the voltage level $V_0$ is not needed. This allows the turn-on time $t_{on}$ and the pause duration $t_{off}$ to be shortened, which allows the switching frequency to remain variable within a narrow range.

BRIEF DESCRIPTION OF THE DRAWINGS

With the aid of the attached drawings, the process is explain in greater detail.

DESCRIPTION OF THE PREFERRED EMBODIMENT

The regulating process for a power converter with a free running oscillator as shown in the present invention is explained with reference to FIG. 1. A power converter 61 is shown with its primary winding 62 and secondary winding 63 separated. The regulation process is performed by five functional units 64, 65, 66, 67, 68.

Figure 3:
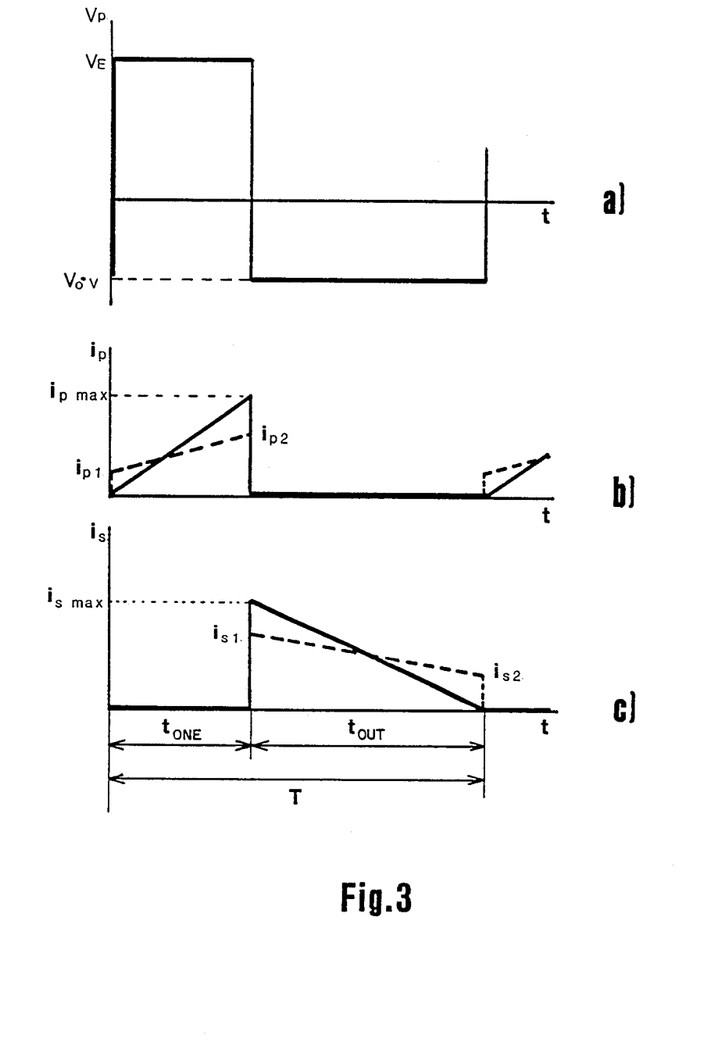
FIG. 3a shows the voltage gradients at the primary winding.
FIG. 3b shows the primary current gradient during triangle and trapezoidal operation.
FIG. 3c shows the secondary current gradient during triangle and trapezoidal operation.
Figure 4:
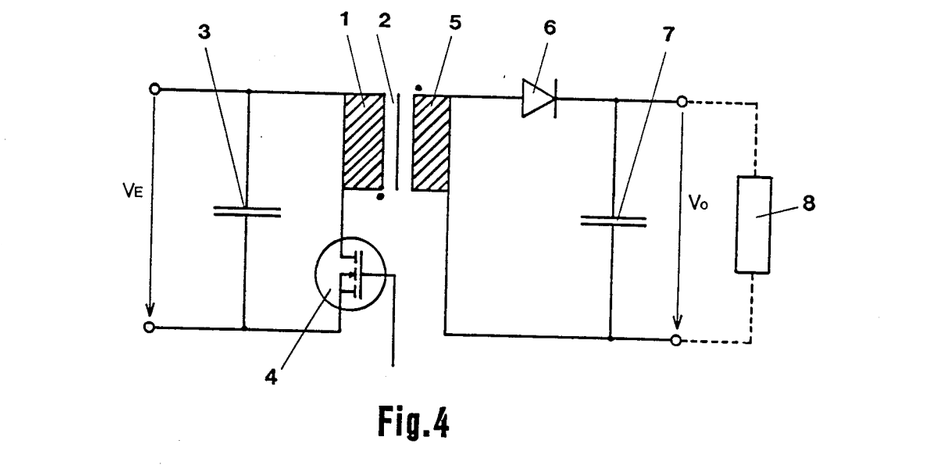
FIG. 4 shows the principal schematic of a power converter.

Functional unit 64 forms the integral $$\int V_E dt$$

where $V_E$ is the input voltage. FIG. 3 shows the time-related voltage and current gradients that occur in the power converter shown in FIG. 4. The rectified DC voltage, $V_E$, which is smoothed by ripple filter capacitor 3, is connected to the primary winding 1 of a transformer 2 via a transistor 4. Transistor 4 is operated in a conducting or a cutoff mode by pulses obtained from the regulating circuit shown in FIG. 1 as functional units 64 through 68. Current will flow in the secondary winding 5 of transformer 2 through the circuit of diode 6, capacitor 7, and an external load 8 only when transistor 4 is in the cutoff state.

FIG. 3a shows the voltage gradient at the primary winding. During the time interval $t_{ON}$ (turn-on time), the primary winding is at the level $V_E$. During the time $t_{OFF}$ (turn-off time), when transistor 4 is in the cutoff state, the primary winding receives the inverse voltage of the power converter output voltage $V_O$ re-transformed by the transformation ratio. During $t_{ON}$, the primary current i p rises linearly, as shown in FIG. 3b (provided $V_E$=constant during $t_{ON}$). The solid line in FIG. 3b shows the current gradient during the so-called triangle operation; the dotted line is for trapezoidal operation.

The following equation is generally applicable:

$$i_p = C \int V_E dt$$

and in particular the following equation is applicable:

$$i_{pmax} = C \int_0^{t_{on}} V dt$$

The voltage-time area created by the integral is therefore a direct dimension for $I_{pmax}$. When, after $t_{ON}$, transistor 4 is in the cutoff mode, the maximum energy has been transferred to the primary winding:

$$E_{max} = \tfrac{1}{2}(i_{pmax}^2 - i_{p1}^2) L_p$$

where $i_{p1}$ is the current turn-on value for trapezoidal operation and $L_p$ the inductivity of the primary winding 1. The rise of $i_p$ is expressed by:

$$\frac{di_p}{dt} = \frac{V_E}{L_p}$$

The operation of functional block 64 is based on the above relationships. $i_{pmax}$ is determined by integral calculus. If a pre-determined value is reached, the conductive phase of transistor 4 is terminated by a control signal to a bi-stable switch 70 that in turn controls transistor 4.

The secondary current $i_s$ now drops linearly from a normal value to zero in triangular operation and to $i_{s2}$ in trapezoidal operation. See, FIG. 3c. Functional unit 65, which receives its input signal from the secondary 63 of the power converter 61, monitors this value and provides a control signal to an AND gate 69 when a predetermined threshold is reached.

The maximum current $I_0$ is monitored by functional unit 66. This functional unit supplies a control or release signal to AND gate 69 only when the output current remains below the predetermined threshold $I_0$. In this case, a secondary short circuit causes the output current to rise to this maximum current. The short circuit must be distinguished from sudden load changes by a suitable current indication process. Functional unit 66 receives its input signal from functional unit 65 because the integral of the secondary current $i_s$ through $t_{OFF}$ corresponds to the average time value of the output current. The circuit is now short-circuit protected.

Functional unit 67 monitors the output voltage $V_0$ of the secondary winding 63 of the power converter 61. It supplies its release control signal to the AND gate 69 when the predetermined level is undershot. The time characteristic of $i_s$ is given by:

$$\frac{di_s}{dt} = \frac{V_O}{L_s}$$

The higher $V_0$ is, the faster $i_s$ drops. In a no-load operation at no-load output of the switching regulator, this would lead to an unlimited rise of the output voltage V $_0$. On the primary side, the largest possible amount of energy is always transferred during the conducting phase of transistor 4. Functional unit 67 thus releases the AND gate 69 only when $V_0 < = V_{0nom}$.

Because the secondary power becomes very small during no-load operation or during a short circuit, the switching frequency of transistor 4 would be considerably lowered. To prevent this, the comparison threshold, which limits the magnitude of the voltage-time integral in functional unit 64, is influenced by functional unit 68. Depending on the pause duration $t_{OFF}$, the threshold for $$i_{pmax} = C \int V_E dt$$

is lowered, which shortens the next conductive phase $t_{ON}$. This shortens the length of the pause because the smaller transferred energy allows the thresholds of functional units 65, 66, 67 to be reached earlier. In no-load operation or during a short circuit, the frequency remains above a minimum frequency as determined by functional unit 68.

Figure 1:
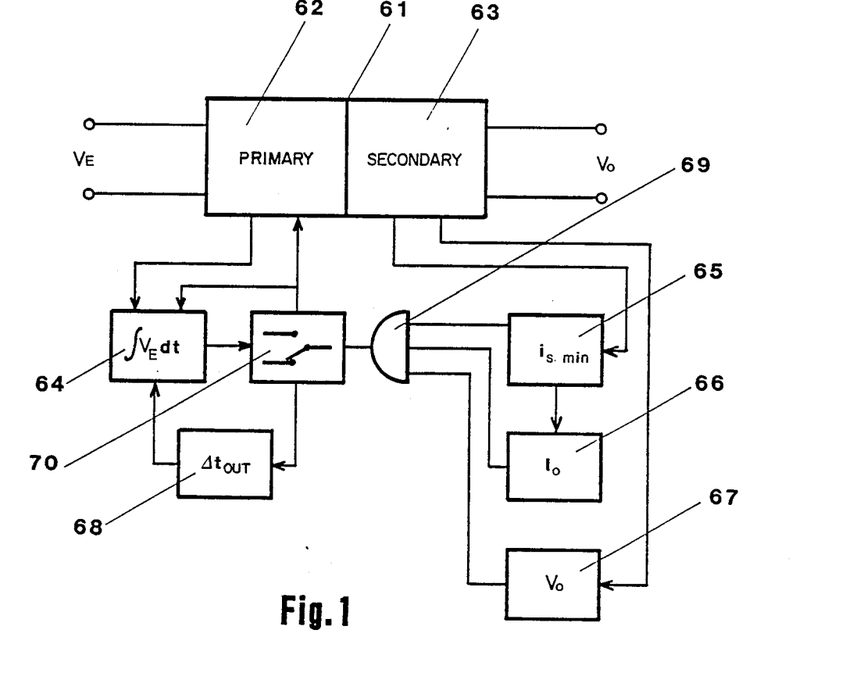
FIG. 1 shows the functional block diagram of the regulating process of the present invention.
Figure 2:
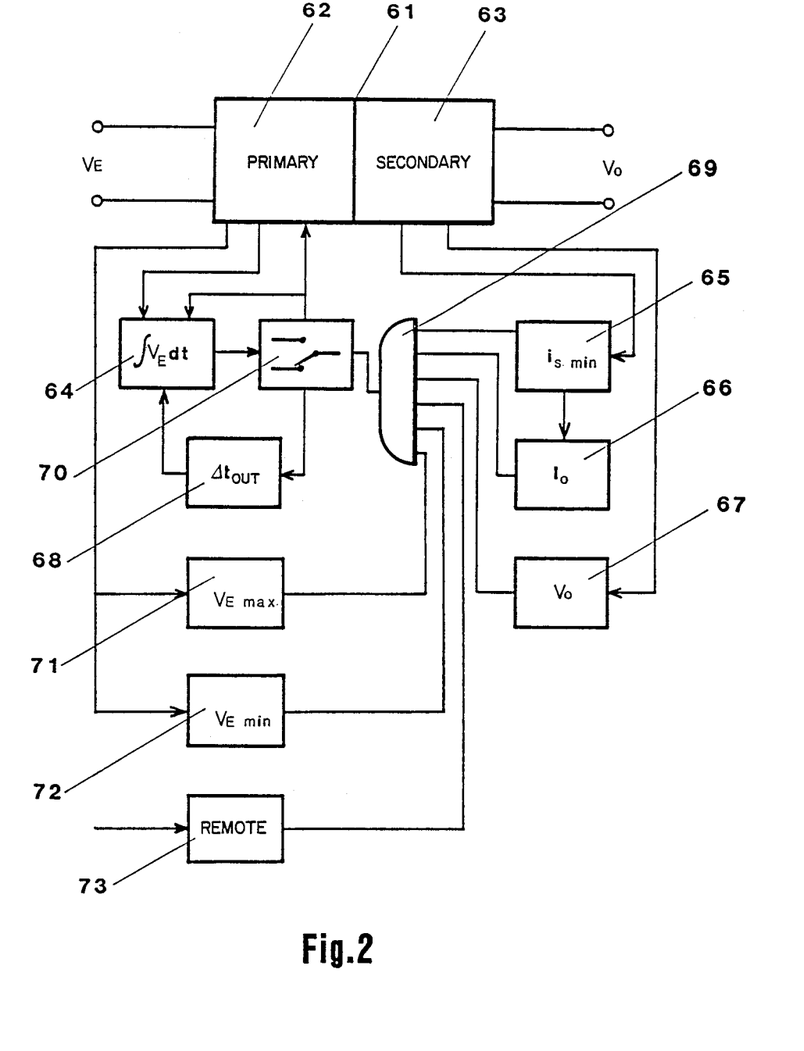
FIG. 2 is an extension of FIG. 1 with additional monitoring and control functions.

FIG. 2 shows an extension of the process shown in FIG. 1 with three more functional units 71, 72, 73. Functional unit 71 monitors the input voltage $V_E$ for overshooting a predetermined maximum value. Functional unit 72 cuts off when $V_E$ undershoots a minimum value. Functional unit 73 allows remote control to maintain the bi-stable switch 70 in the position in which transistor 4 is cut off.

Figure 5:
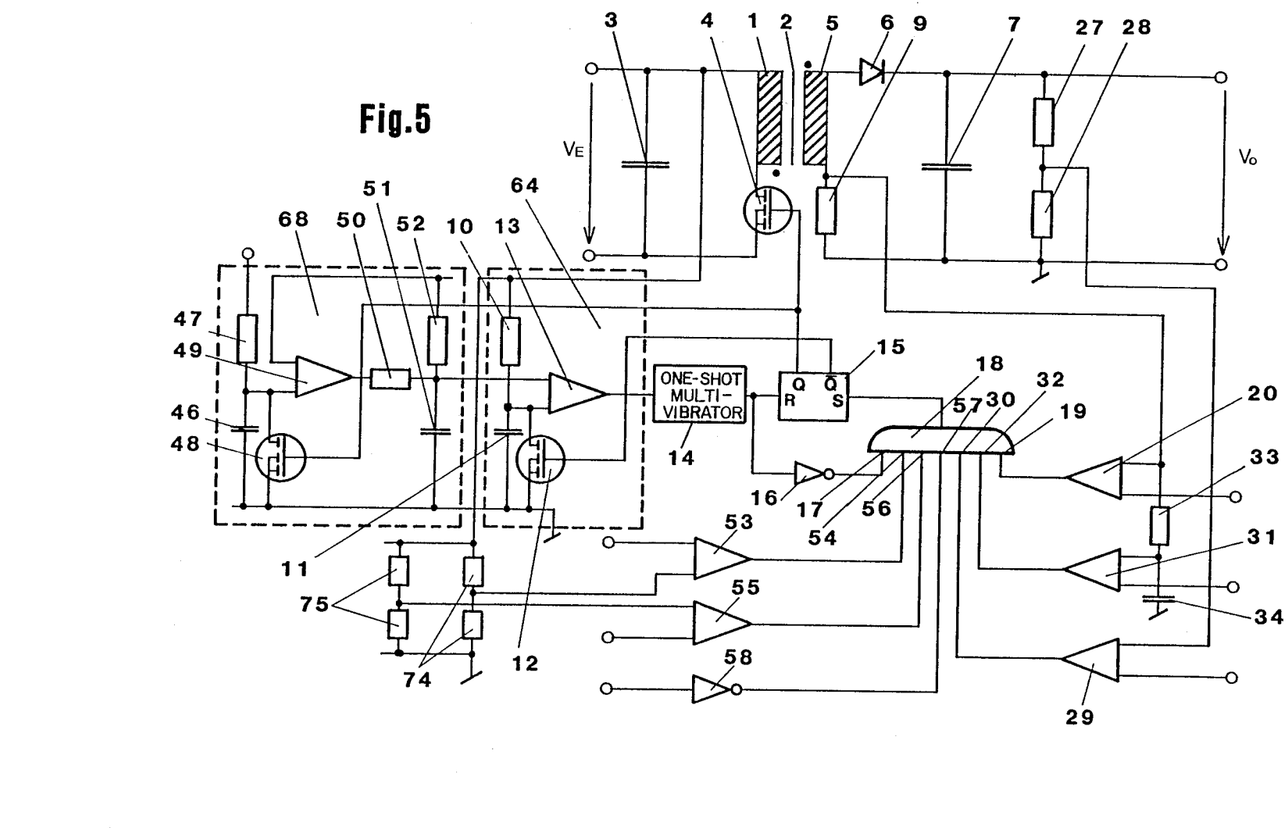
FIG. 5 shows the schematic of the power converter according to the invention.

FIG. 5 shows a power converter in which the process in the invention is carried out. The power converter shown in FIG. 4 is supplemented by a precision measuring resistor 9 and a voltage divider consisting of resistors 27 and 28, which divide the output voltage $V_0$. The partial voltage $V_{OR}$ is fed to a comparator 29, which compares it with a reference voltage $V_{ref}$. If $V_{OR} < = V_{ref}$, the output of the comparator goes high and drives the input 30 of AND gate 18. The comparator 29 is the equivalent component of functional unit 67, and the AND gate 18 is the equivalent of the AND gate 69 shown in FIGS. 1 and 2.

The secondary current $i_s$ produces a voltage drop $V_{RS}$ across the precision resistor 9, which is compared in a comparator 20 with a small threshold voltage $V_{RSmin}$. When $V_{RS} < = V_{RSmin}$, the output of comparator 20 goes to a high state and thus controls the input 19 to the AND gate 18. The threshold $V_{RSmin}$ is reached when transformer 2 is sufficiently demagnetized to be re-magnetized by the primary winding 1. This avoids transformer core 2 saturation.

The voltage $V_{RS}$ is simultaneously present at a resistor 33, which forms, in conjunction with capacitor 34, an RC network. The time constant of this RC network is large compared to the expected switching frequency. Thus, the input signal of comparator 31 receives a mean value of $i_s$ that has small fluctuations. The comparison voltage $V_{10}$ is chosen to bring the output of comparator 31 to a high state only when $V_{RS} < V_{10}$. If this condition is not fulfilled, as in the case of a short circuit, AND gate 18 remains cut off because comparator 31 is connected to an input 32 of the AND gate. Comparator 20 is an equivalent of functional unit 65. Comparator 31, together with the RC network, 33, 34, forms functional unit 66.

Functional unit 64 of FIG. 5 (framed with a dotted border) contains a comparator 13, which receives its comparison voltage from functional unit 68 (also framed with a dotted border).

The input signal of comparator 13 is obtained from an RC network consisting of a resistor 10, which is connected across input voltage $V_E$, and a capacitor 11. A transistor 12, which cuts off during the switch-on time $t_{ON}$ of transistor 4, shorts out the capacitor during the switch-off time, $t_{out}$. If RC is $>> t_{ON}$, the voltage gradient at capacitor 11 will be linear and proportional to the flow of $i_p$ and thereby also proportional to $\int V_E dt$.

A further RC network, which consists of a resistor 47 and a capacitor 46, is connected to a constant voltage with $V_{cst} > V_{ref}$. Capacitor 46 is shorted out through a transistor 48, which operates in conjunction with transistor 4. The voltage at capacitor 46 forms the input signal to a comparator 49, whose comparison voltage is $V_{Ref}$. During $t_{ON}$, transistor 48 conducts. Capacitor 46 is therefore shorted out, and the comparator 49 output is high. During $t_{OFF}$, transistor 48 cuts off. Capacitor 46 charges up and can, if $t_{OFF}$ is too long, reach the comparison voltage level $V_{Ref}$. Then comparator 49 switches off, and its output becomes low. Comparator 49, which, for example, can have an open collector output, then discharges another capacitor 51, which has a time constant given by the combination of two resistors 50, 52 and the capacitor 51. Capacitor 51 is discharged to the voltage level that is established through $V_{Ref}$ at resistor 52 by the division ratio of resistors 50 and 52. The voltage thus determined serves as the comparison voltage for comparator 13. If the pause $t_{OFF}$ is still short enough, the open collector output of the comparator remains inactive, and the full reference voltage is present at comparator 13 through resistor 52. This corresponds to operation at maximum voltage-time area. Therefore, the longer $t_{OFF}$ lasts, the lower the comparison voltage for comparator 13. This results in a shortening of the subsequent integration time and a shortening of the pause. By proper selection of resistor 47 and capacitor 46, the switching frequency is kept within comparatively narrow limits. This allows the keying ratio $t_{OFF}/t_{ON}$ to become very small. Components 46 to 52 form the functional unit 68 shown in FIGS. 1 and 2.

Comparator 13 feeds a one-shot multivibrator 14. Its output signal simultaneously drives a flip-flop 15 and an inverter 16. Flip-flop 15 is an equivalent of the bi-stable switch 70 in FIGS. 1 and 2. The pulse from the one-shot multivibrator indicates the end of phase $t_{ON}$ and is applied to the reset input R of flip-flop 15. This causes its output $\overline{Q}$ to go to a high state, and phase $t_{OFF}$ begins. The components contained in functional units 64, 68 represent a frequency regulating circuit that regulates slowly in comparison with the switching frequency of the power converter. The output signals of invertor 16 and comparators 20, 29, 31 drive the AND gate 18. Disregarding for now two additional comparators 53, 55 and an inverter 58, the output of AND gate 18 goes to a high state if comparators 20, 29, 31 also have outputs in a high state. The output of invertor 16, which drives input 17 of AND gate 18, is continuously at a high state except during pulses from the one-shot multivibrator 14. This prevents a simultaneous input of set and reset pulses to the flip-flop 15. This also defines a minimum duration of $t_{OFF}$, which corresponds to the pulse-length of the one-shot multivibrator 14. AND gate 18, which drives the set input S of flip-flop 15, thereby starts the $t_{ON}$ phase and brings the output Q of flip-flop 15 to a high state and output $\overline{Q}$ to a low state. Comparators 53, 55 monitor the power converter's input voltage $V_E$, which supplies their input signal through two voltage dividers 74, 75. The output of comparator 53 goes low if its input voltage becomes higher than the pre-determined threshold, and the output of comparator 55 goes to a low state if the minimum input voltage $V_E$ undershoots the established threshold. This prevents a further $t_{ON}$ phase.

Invertor 58, which normally has a high output, provides for remote control of the power converter in the invention.

Comparators 53, 55 and invertor 58 drive the inputs 54, 56, 57 of AND gate 18.

Figure 6:
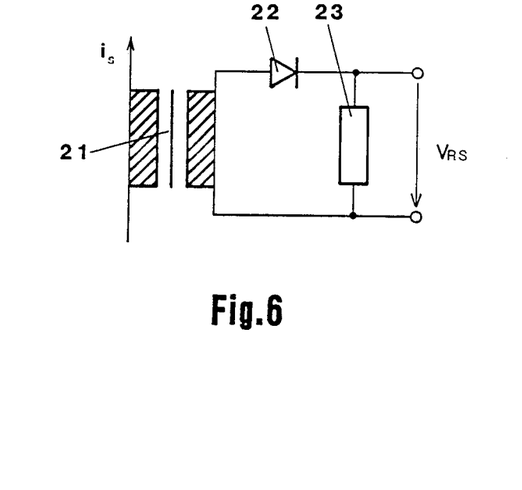
FIG. 6 is a first detail variation of FIG. 5.

In many cases, it is necessary to galvanically separate the secondary of the power converter from the primary. According to the invention, the signal path of comparators 20, 29, 31 and invertor 58 to AND gate 18 can be replaced by other coupling elements, for instance, optical coupling devices. The invention further includes the concept of replacing signal $V_{RS}$, which is gained through the voltage drop at precision resistor 9, by a current transformer 21 shown in FIG. 6. Current $i_s$ flows through the primary of the current transformer, whose secondary current flows through a diode 22 and a precision resistor 23. The voltage drop across the precision resistor 23 is then the signal $V_{RS}$, which is explained in the comments on FIG. 5. The solution shown in FIG. 6 also effects power comments on FIG. 5. The solution per FIG. 6 also effects power separation, that is, galvanic separation of the primary and secondary side. Always contained in the invention concept is the combination of optical signal coupling, or example, of the output signal of comparator 29, with duplication of $V_{RS}$ floating as per FIG. 6.

Figure 7:
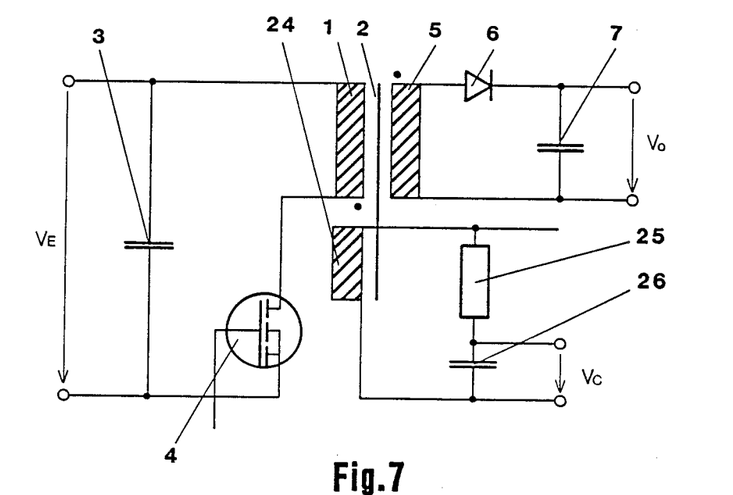
FIG. 7 is a second detail variation of FIG. 5.
Figure 8:
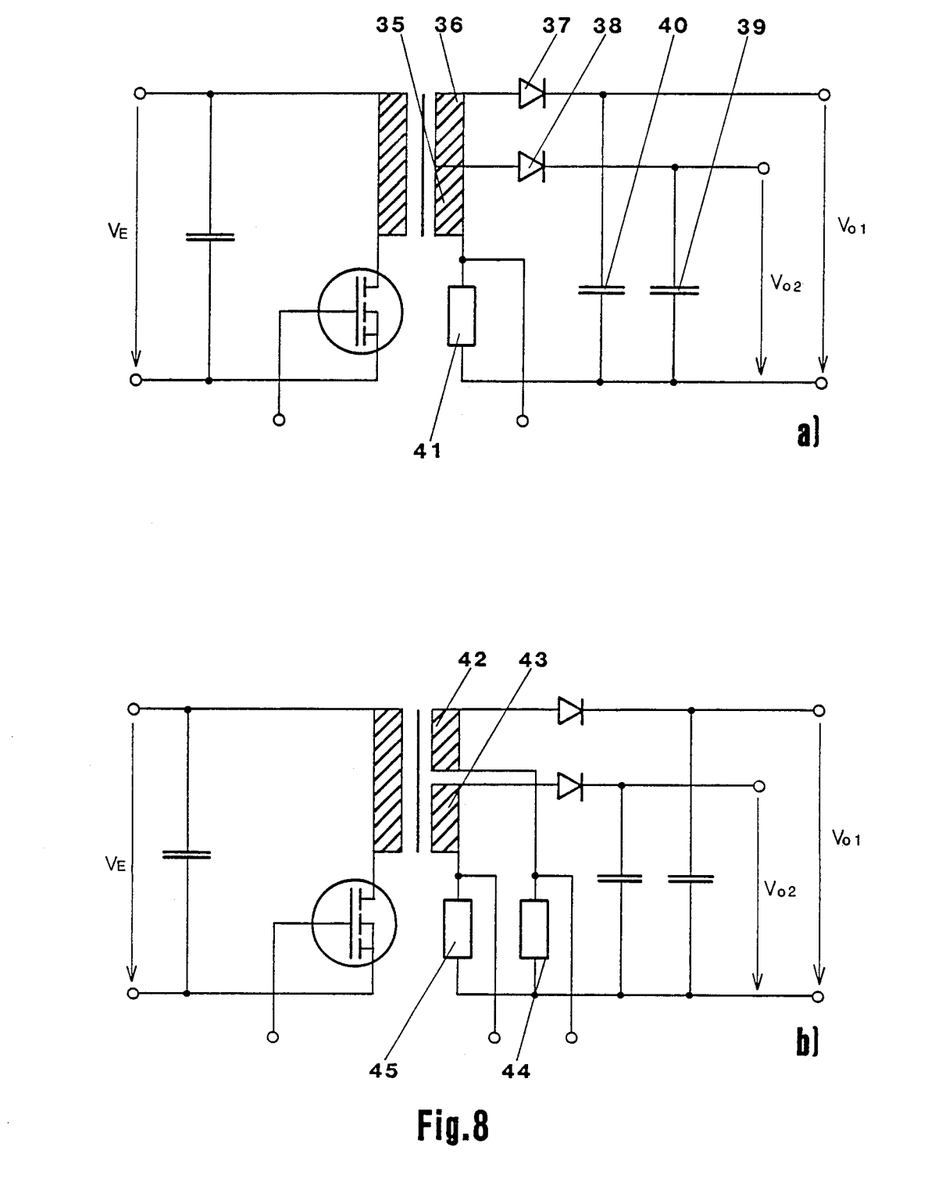
FIG. 8a shows a first circuit for obtaining a control signal when the power converter has several outputs.
FIG. 8b shows a second circuit for obtaining a control signal when the power converter has several outputs.

The invention also allows the solution shown in FIG. 7 to gain the signal for comparators 13, 20, 29 and 31 at the same time. Transformer 2 shown in FIG. 5 is provided with a third winding 24. During the time interval $t_{ON}$, a capacitor 26, which forms an RC network in conjunction with a resistor 25, is charged up, and voltage $V_C$ rises linearly if $RC >> t_{ON}$. During the time period $t_{OFF}$, discharge, or rather a charge reversal, of capacitor 26, takes place, and the voltage drops linearly. The voltage rise is processed by comparator 13, and the voltage drop by comparator 20, or comparator 31, as the case may be. The reverse voltage of winding 24 can be rectified through a diode (not shown) and filtered by a filter capacitor in the conventional manner. An equivalent of the output voltage $V_0$ is then obtained at this filter capacitor. The voltage can then be fed to the comparator 29 for the purpose of voltage regulation. It is thereby evident that functional units 64 to 68 can be placed in the primary, as well as in the secondary, or even in a mixed arrangement. If the invention is provided with several outputs, each individual output, or several together, can be monitored for a short circuit or simply for exceeding the limit current $I_0$. Such devices are shown in FIG. 8. In place of several outputs, two outputs are illustrated here. In FIG. 8a, the secondary winding 5 from FIG. 5 is separated into two partial windings 35, 36, which are each connected through a diode 37, 38 and a capacitor 39, 40. A resistor 41 is connected in series with partial windings 35, 36, and it monitors the sum of the output currents and is an equivalent of the precision resistor 9 from FIG. 5. Both loads have a chassis ground return as a prerequisite for functioning of the monitoring feature. FIG. 8b shows a variation of this circuit. In this case, each output circuit is provided with its own, individually monitored secondary 42, 43. For this reason, the circuit also contains two precision resistors 44, 45.

If both circuits are monitored jointly, the circuit shown in FIG. 5 is applicable. The variation of FIG. 8b then requires doubling of the regulating circuit formed by comparators 20, 31 from FIG. 5.

What is claimed is:

1. A process for the operation of a free running oscillating power converter which includes a transformer (2), a primary winding (1, 61), at least one secondary winding (5) and a bi-stable switch (70), comprising the steps of:
    monitoring the demagnetization of the secondary winding (5) of transformer (2) and providing a first release signal if a threshold voltage falls below a threshold level;
    monitoring the maximum value of the time averaged secondary current of the transformer (2) and supplying a second release signal as long as the current falls below this maximum value;
    monitoring the output voltage of the power converter and supplying a third release signal as long as this output voltage does not exceed a predetermined maximum value;
    the first, second and third release signals controlling the bi-stable switch (70), said bi-stable switch connecting the input voltage of the power converter to the primary winding (61);
    forming the voltage-time integral of the input voltage to the power converter, whose target value is lowered according to the time period in which the input voltage of the power converter is separated from the primary winding (1); and
    delivering, when a predetermined magnitude of the voltage-time integral is reached, a control signal to the bi-stable switch (70) that resets same.

2. The process as set forth in claim 1 further comprising the steps of:
    monitoring the input voltage of the power converter;
    providing a fourth release signal as long as a predetermined maximum value of the input voltage is not exceeded; and
    delivering a fifth release signal as long as the predetermined value is not undershot.

3. The process as set forth in claim 1 or 2 further comprising the step of turning the switching controller on or off by remote control.

4. A free running, oscillating power converter including a transformer (2) that has one primary winding and at least one secondary winding (5, 24, 42, 43), a capacitor (3) on the primary side, a diode (6) and a capacitor (7) on the secondary side, and a transistor (4) to turn the input voltage on or off said apparatus comprising:
    functional unit (65), which monitors the current in the secondary winding (5) comprising a comparator (20), whose input signal is the voltage drop across a precision measuring resistor (9) through which the secondary current flows and whose reference voltage determines the switching threshold, $V_{RSmin}$ whereby the output voltage of the comparator (20) is at high state if the voltage drop across the precision resistor reaches or falls below the reference voltage $V_{RSmin}$;
    functional unit (66), which monitors the output current comprising a comparator (31), whose input signal forms, via an RC network consisting of a resistor (33) and a capacitor (34), the average voltage drop across a precision measuring resistor (9) and whose reference voltage corresponds to the average output current, whereby the inputs of the comparators (20) and (31) are connected through the resistor (33), and the input of the comparator (31) is connected to the voltage reference point via capacitor (34) and the output voltage of the comparator (31) is at a high state, if the voltage between the resistor (33) and the capacitor (34) reaches or undershoots the reference voltage of the comparator (31), the output voltage of the comparator (31) thereby being at a high state;
    functional unit (29), which monitors the output voltage $V_0$ comprising a comparator (29) whose input signal is supplied by a voltage divider consisting of resistors (27, 28), which is fed from the output voltage $V_0$ and whose referenced voltage determines this output voltage, whereby if the voltage from the voltage divider (28, 28) reaches or undershoots the reference voltage of the comparator (29), the output voltage of the comparator (29) is at high state;
    said outputs of the comparators (20, 29, 31) together with the output of an inverter (16) being connected to the inputs (19, 30, 32, 17) of an AND gate (18), whose output voltage is at a high state if all input voltages are at a high state, whereby the output of the AND gate (18) is connected to the set input S of a flip-flop (15);

the reset input R of the flip-flop (15) being driven by a one-shot multivibrator (14) and is connected to the input of the invertor (16);

functional unit (64) comprising a comparator (13); an RC network, which includes a resistor (10) and a capacitor (11), and a transistor (12); the signal input of the comparator (13) is fed from the input voltage $V_E$ of the power converter through resistor (10) and is, at the same time, connected through the capacitor (11) as well as—in parallel to same—through the transistor (12) in parallel, and they connect the signal input of the comparator (13) to the voltage reference point; the transistor (12) being controlled by the output, designated with Q, of the flip-flop (15) and the reference voltage of the comparator (13) being supplied by the output of the functional unit (68);

functional unit (68) comprising a comparator (49), whose output is provided with an open-collector circuit, which receives its current from a resistor (50), resistor 50 being connected to the reference voltage of the comparator (49) through resistor (52) and connected via a capacitor (51) to the voltage reference ointat which the resistors (50, 52) and the capacitor (51) are joined together is connected to the input of the comparator (13);

a signal input of the comparator (49) being connected through a resistor (47) to a constant voltage that is higher than the reference voltage of the comparator (49) and that the signal input of the comparator (49) being also connected to the voltage reference point through a capacitor (46) as well as through a transistor (48), whereby transistor (48) is driven by the flip-flop (15) output (Q), which also controls the transistor (4) that connects the primary winding (1) of the power converter with the input voltage $V_E$;

a time constant formed by resistor (47) and capacitor (46) being larger than the turn-off time, $t_{OFF}$, of the power converter, which the power converter needs to transfer the maximum energy received during $t_{ON}$;

a time constant formed by resistor (47) and capacitor (46), and the voltage $V_{cst} > V_{Ref}$ being dimensioned to assure that the time period in which the voltage at the capacitor (46) reaches the level $V_{Ref}$ is as long as the minimum time period $t_{OFF}$ that the power converter requires to transfer the maximum energy, whereby the starting points of the pause regulation is established;

the output of comparator (13) being low when the voltage at capacitor (1) is smaller than the reference voltage of the comparator (13); and the output of comparator (13) when it is at the high state driving the one-shot multivibrator (14), which then provides a single pulse of predetermined length, and thus resetting the flip-flop (15), whereby the turn-on time, $t_{ON}$ is ended, and the cut-off phase or pause, $t_{OFF}$, of transistors (4, 48) is started.

5. The free running, oscillating power converter as set forth in claim 4 further comprising:

a comparator (53) whose input signal is the input voltage, $V_E$, of the power converter divided by a voltage divider (74) and that said comparator (53) comparing this input signal with a fixed reference voltage in such a way that its output is at a high state if the input signal does not exceed the reference voltage;

a comparator (55) whose input signal is the input voltage, $V_E$, of the power converter divided by a voltage divider (75) and that said comparator (55) comparing this input signal with a fixed reference voltage so that its output is at a high state if the input signal does not fall below the reference voltage; and an invertor (58), whose input is controlled from a voltage source external from the power converter, whereby the outputs of comparators (53, 55) and the inverter (58) are connected to three additional inputs (54, 56, 57) of the AND gate (18), and this output goes to the high state only if the inputs (54, 56, 57) are also in the high state.

6. The free running, oscillating power converter as set forth in patent claims 4 and 5 where the transformer (2) has a single secondary winding (5) and a precision resistor (9).

7. The free running, oscillating power converter as set forth in patent claims 4 or 5 where the secondary winding (5) of transformer (2) is separated into two partial windings (35, 36) and is provided with a series-connected precision resistor (41).

8. The free running, oscillating power converter as set forth in patent claims 4 or 5 with the following additional features:

the transformer (2) has two secondary windings (42, 43) connected to two precision resistors (44, 45) precision resistor (44) being connected in series with the secondary winding (42), and precision resistor (45) is connected in series with the secondary winding (43); and the comparators (20, 31), the resistor (33) that ties the two together, and capacitor (34) are each provided in duplicate with one pair of comparators (20, 31) being fed by the voltage across precision resistor (44), and the other pair of comparators is fed by the voltage across precision resistor (45).

9. The free running, oscillating power converter as set forth in patent claim 4 where the input signals are conducted to the comparators (20, 31, 29) by means of galvanic connections.

10. The free running, oscillating power converter as set forth in patent claim 4 where the input signals are supplied to the comparators (20, 31, 29) by means of optical coupling.

11. The free running, oscillating power converter as set forth in patent claim 5 where the input signals of comparators (20, 31, 29) are supplied to comparators (53, 55) by optical coupling and are conducted to the inverter (58) by means of galvanic connections.

12. The free running, oscillating power converter as set forth in patent claim 5 where the input signals are supplied to the comparators (13, 53, 55) and the invertor (58) by optical coupling and the input signals are conducted to comparators (20, 31, 29) by galvanic connections.

13. The free running, oscillating power converter as set forth in patent claims 4 or 5 where transformer (2) has a current transformer (21) connected in series, the secondary circuit of which is provided with a diode (22) and a precision resistor (23), which supplies the input signal to comparators (20, 31).

14. The free running, oscillating power converter as set forth in claims 4 or 5 wherein transformer (2) is provided with a second secondary winding, which feeds an RC network consisting of resistor (25) and capacitor (26), the supplying the input signals to the comparators (20, 31) and the time constant of the RC network being large compared to the longest switching frequency period to be expected.

* * * * *

UNITED STATES PATENT AND TRADEMARK OFFICE
CERTIFICATE OF CORRECTION

PATENT NO. : 4,864,480
DATED : September 5, 1989
INVENTOR(S) : Domenic Melcher

It is certified that error appears in the above-identified patent and that said Letters Patent is hereby corrected as shown below:

Column 1, [54] delete --PROCESS-- and insert --METHOD OF AND APPARATUS--; delete --AND SWITCHING CONTROLLER FUNCTIONING ACCORDING TO THIS PROCESS--

Signed and Sealed this

Eleventh Day of June, 1991

Attest:

HARRY F. MANBECK, JR.

*Attesting Officer*

*Commissioner of Patents and Trademarks*